United States Patent
Hou et al.

(10) Patent No.: US 9,973,889 B2
(45) Date of Patent: May 15, 2018

(54) TELECOMMUNICATION NETWORK SIGNAL ANALYSIS FOR MATCHING A MOBILE DEVICE CELLULAR IDENTIFIER WITH A MOBILE DEVICE NETWORK IDENTIFIER

(71) Applicant: Accenture Global Solutions Limited, Dublin (IE)

(72) Inventors: Fang Hou, Beijing (CN); Yan Gao, Beijing (CN)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 0 days. days.

(21) Appl. No.: 15/352,336

(22) Filed: Nov. 15, 2016

(65) Prior Publication Data

US 2017/0142547 A1 May 18, 2017

Related U.S. Application Data

(63) Continuation of application No. PCT/CN2015/094689, filed on Nov. 16, 2015.

(51) Int. Cl.
*H04W 4/02* (2018.01)
*H04L 29/12* (2006.01)
*G06F 7/02* (2006.01)
*G06F 17/30* (2006.01)
*H04W 4/04* (2009.01)

(52) U.S. Cl.
CPC ............... *H04W 4/02* (2013.01); *G06F 7/02* (2013.01); *G06F 17/30241* (2013.01); *H04L 61/605* (2013.01); *H04L 61/6022* (2013.01); *H04W 4/04* (2013.01)

(58) Field of Classification Search
CPC ......... H04W 4/02; H04W 4/04; H04W 84/12; H04W 12/06; H04W 48/16; H04W 8/005; H04W 4/025; H04W 64/00; H04W 8/24; H04W 4/021; H04W 8/22; G06F 7/02;
(Continued)

(56) References Cited

U.S. PATENT DOCUMENTS

| 8,830,909 B1 | 9/2014 | Octeau et al. |
| 2013/0328725 A1 | 12/2013 | Wuoti et al. |
| 2014/0066028 A1 | 3/2014 | Miller et al. |

FOREIGN PATENT DOCUMENTS

| CN | 101132218 A | 2/2008 |
| CN | 101387699 A | 3/2009 |

(Continued)

OTHER PUBLICATIONS

International Search Report and Written Opinion for PCT/CN2016/106144, Completed Dec. 27, 2016.
(Continued)

*Primary Examiner* — Nam Huynh
(74) *Attorney, Agent, or Firm* — Brinks Gilson & Lione

(57) ABSTRACT

A signal analysis system matches a mobile device cellular identifier to a mobile device network identifier. The system obtains multiple cellular positioning records (CPRs) and multiple network positioning records (NPRs). These records include different types of information because they are generated by different types of networks. The system performs spatial matching and temporal matching of the CPRs and the NPRs to identify a specific mobile device cellular identifier among the CPRs that belongs to a mobile device identified by a specific mobile device network interface identifier among the NPRs.

20 Claims, 11 Drawing Sheets

(58) Field of Classification Search
CPC ........... G06F 17/30241; H04L 61/6022; H04L 61/605
See application file for complete search history.

(56) References Cited

FOREIGN PATENT DOCUMENTS

WO     2011028452 A2    3/2011
WO     2015069320 A2    5/2015

OTHER PUBLICATIONS

Extended European Search Report for European Application No. 16199082.5, completed Mar. 28, 2017.

TELECOMMUNICATION NETWORK SIGNAL ANALYSIS FOR MATCHING A MOBILE DEVICE CELLULAR IDENTIFIER WITH A MOBILE DEVICE NETWORK IDENTIFIER

RELATED APPLICATIONS

This application is a continuation application under 35 U.S.C. § 120 to application No. PCT/CN2015/094689, filed Nov. 16, 2015, which is incorporated herein by reference in its entirety.

TECHNICAL FIELD

This disclosure relates to telecommunication networks. Particularly, this disclosure relates to matching a mobile device cellular identifier to a mobile device network identifier using information from different network sources.

BACKGROUND

In telecommunication networks, a mobile device is served by nearby cellular towers. The cellular tower may log information related to the communication between mobile device and towers, such as signal strength, cellular identifier, and timestamps. The cellular network may use triangulation techniques to position and track the mobile device. Similarly, indoors a relatively shorter distance network, for example, a WiFi network, may contain access points (APs) that passively capture the probe requests sent from a mobile device. The probe request may include information such as signal strength, type of the device, and MAC address of the mobile device. Improvements in network analysis will enhance the capabilities of networks operating under different protocols and standards.

DETAILED DESCRIPTION

Figure 1:
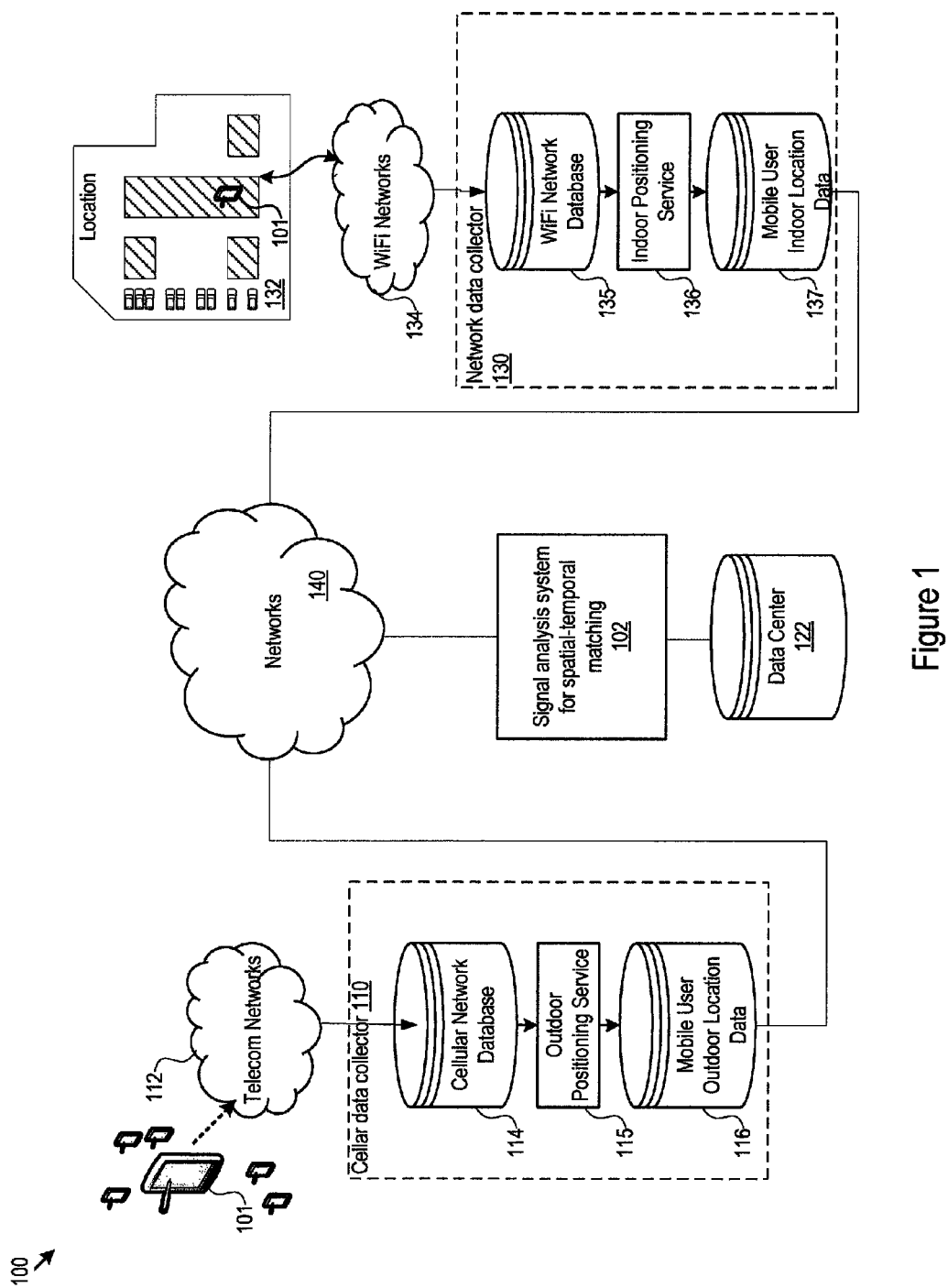
FIG. 1 shows an example system diagram that depicts the entities that cooperate and exchange information for matching a mobile device cellular identifier and a mobile device network interface identifier.

In a telecommunication network (e.g., a cellular phone network), a mobile device such as a mobile phone, a tablet, laptop, or other device may be served by nearby cellular towers. The cellular towers may log many different types of network communication information exchanged between mobile devices and the towers. Examples include timestamps, events, and locations. The telecommunication network may use the logged information for positioning and tracking the mobile device, as examples.

Different from device-based positioning, cellular-network-based positioning (CNBP) does not require the mobile device to actively compute position (e.g., through GPS calculations performed locally on the device) and report it to the network. Instead, the cellular towers may passively receive the signals broadcast by the mobile device and use the signals that were broadcast to determine the position of each device. In this respect, CNBP is non-intrusive.

The accuracy of CNBP may depend on the density of cellular towers. In general, the accuracy for CNBP may be about 50-200 meters. As such, the applications of CNBP include positioning and location tracking in larger scale scenarios that require relatively lower accuracy. For example, CNBP may estimate crowd density in an outdoor event or compute driving mileage of a driver in past six months. In CNBP, a mobile device may be identified by its phone number or international mobile station equipment identifier (IMEI) (e.g., or another identifier for a subscriber identity module (SIM) card in the mobile device).

There are other types of networks than cellular networks. For instance, indoor IEEE 802.11 (WiFi) networks operate over relatively shorter distances. WiFi network based positioning (WNBP) in an indoor environment may outperform CNBP with respect to accuracy. In WNBP, an access point (AP) may passively capture the network probe requests sent from a mobile device. The network probe request may include information such as timestamp, signal strength, type of device, and MAC address. Based on the signal strength, WNBP may use triangulation among multiple different APs to increase position accuracy to, e.g., 4~5 meters. Such accuracy may allow WNBP to support most indoor positioning and location tracking applications. For example, a shopping mall may use WNBP to track their customers' movements inside the mall. In WNBP, a mobile device is identified by its MAC address, and the phone number and IMEI are unknown.

CNBP and WNBP are disconnected. That is, while CNBP may be used to track a mobile device identified by an first type of identifier, such as a phone number or IMEI, in the outdoor environment, WNBP may be used to track a mobile device that may be identified by a different type of identifier, such as a MAC address, in the indoor environment. The signal analysis system described below links the mobile device that is tracked by CNBP and that is separately tracked by WNBP in order to determine both outdoor and indoor movements and behaviors for the mobile device holders.

For example, when a customer enters a shopping mall, the mall operator may want to know or assign an analysis segment to the customer. The analysis segment for the customer may be derived from his or her outdoor trajectory, e.g., where he lives, where he works, where else he likes to go shopping, whether he travels, sports, or engages other outdoor activities and other factors. Based on the analysis segment, the mall operator build a uniform profile for the customer and may choose, e.g., targeted promotional activities for the customer.

The signal analysis system maps a mobile device cellular identifier of one type, such as a phone number, to an identifier of a different type, such as a mobile device network interface identifier (e.g., a MAC address). The signal analysis system does so without modifying either the cellular network protocol or the WiFi network protocol. The MAC address may also be referred to as a burned-in address, a hardware address, or a physical address. The mobile device network interface identifier may be implemented using an IEEE 802.11 address or another IEEE 802 address, such as Ethernet. This signal analysis system may integrate outdoor tracking and indoor tracking in order to create the uniform customer profile and determine analysis segmentations for the customer.

FIG. 1 shows an example system diagram 100 that depicts the entities that cooperate and exchange information for matching a mobile device cellular identifier and a mobile device network interface identifier, e.g., a mobile device cellular identifier and a mobile device network interface identifier, to a common entity. A signal analysis system 102 performs spatial-temporal matching. The signal analysis system 102 communicates with a cellular data collector 110 and a network data collector 130 to obtain, e.g., location data of a mobile device 101 via networks 140.

The cellular data collector 110 may collect location data of the mobile device 101 when the mobile device 101 is covered by telecommunication networks 112, including cellular networks. As shown in FIG. 1, the mobile device 101 is covered by telecommunication networks 112. The telecommunication networks 112 may generate cellular data for the mobile device 101 and the generated data may be stored in a cellular network database 114. An outdoor positioning service 115 may obtain cellular data from the cellular network database 114 and may generate cellular positioning records (CPRs). The CPRs may include a first type of identifier, e.g., a cellular identifier such as a cellular phone number or IMEI number, a location of the mobile device 101, and a cellular event timestamp for the mobile device 101. The event timestamp may capture the time that a specific event happened for the mobile device 101, such as time of entry to a location or time of exit from a location. The CPRs may be stored in the mobile user outdoor location data database 116 and may be retrieved through the networks 140, e.g., responsive to a request to the cellular data collector 110 from the signal analysis system 102 for spatial-temporal analysis and matching.

The network data collector 130 may collect location data of the mobile device 101 when the mobile device 101 is covered by a second type network, e.g., a WiFi network. FIG. 1 also shows the second type of network, e.g., a relatively shorter distance WiFi network 134. The mobile device 101 may enter and exit the pre-determined location 132 that is covered by the WiFi networks 134. The WiFi networks 134 may generate network data for the mobile device 101 and the generated data may be stored in a WiFi network database 135. An indoor positioning service 136 may obtain network data from the WiFi network database 135 and may generate network positioning records (NPRs), e.g., via a triangulation method. The NPRs may include a network interface identifier such as a media access control address (MAC address), a location of the mobile device 101 and a network event timestamp for the mobile device 101. The NPRs may be stored in the mobile user indoor location data database 137 and may be retrieved through the networks 140, e.g., responsive to a request to the network data collector 130 from the signal analysis system 102 for spatial-temporal analysis.

The signal analysis system 102 may request cellular data from the cellular data collector 110 and network data from the network data collector 130 through the networks 140. The cellular data received by the signal analysis system 102 may be in the form of CPRs and may be used for tracking a mobile device's position in a first type of network, e.g., a cellular network. The network data received by the signal analysis system 102 may be in the form of NPRs and may be used for tracking a mobile device's second type of network position, e.g., in a short distance WiFi network. The signal analysis system 102 may communicate and store obtained cellular data and network data either in a local database or remotely, e.g., in a data center database 122.

Figure 2:
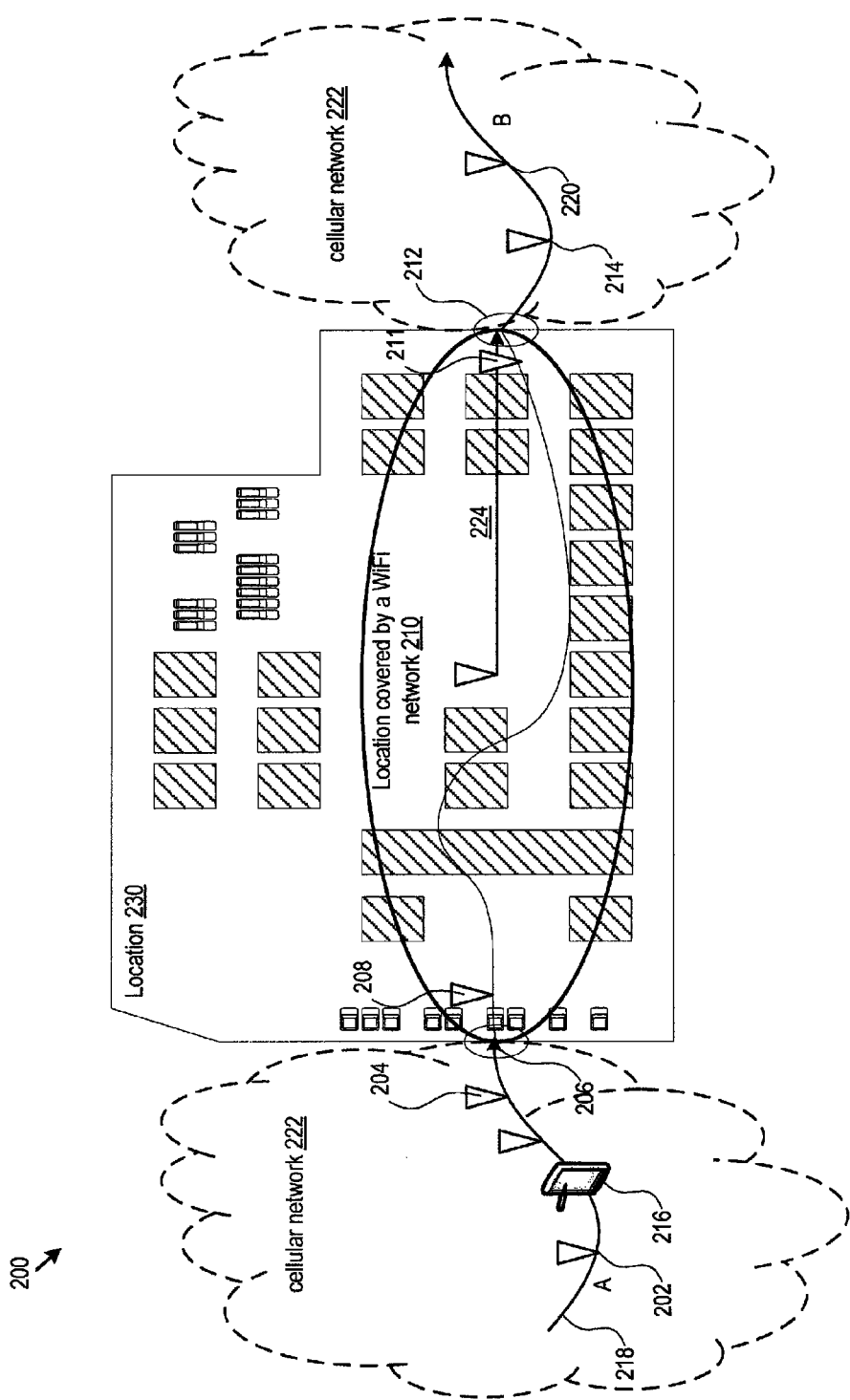
FIG. 2 illustrates an example of a mobile device traversing a location that is covered internally by a network, e.g., a WiFi network.

FIG. 2 illustrates an example of a mobile device traversing a location that is covered internally by a network 200, e.g., a WiFi network 210. As illustrated in FIG. 2, a mobile device 216 moves along a route 218 from that passes the location A 202, enters and exits the location covered by the WiFi network 210, and continues along its route through location B 220.

Both the location A 202 and the location B 220 are covered by the first type of network, e.g., the cellular network 222. As one example, the time (T) and locations such as longitude (lon) and latitude (lat) of some discrete points along the route 218 maybe recorded as the trajectory points by the cellular network 222 for the mobile device 216, e.g., including point A 202, point B 220. The entry point and exit point of mobile device 216 might not be accurately captured by the cellular network 222. The time T1 when the mobile device 216 was at the cellular network position 204 and the [lon, lat] of position 204 may be recognized as the entry event of mobile device 216 to the location 230. The time T2 when the mobile device 216 was at the cellular network position 214 and the [lon, lat] of position 214 may be recognized as the exit event of mobile device 216 from the location 230.

As such, the cellular network 222 might not provide the arrival time Ta and departure time Td for the mobile device 216 to enter and exit the pre-determined location 230. Ta and Td may be calculated based on the entry and exit event of mobile device 216 recorded by cellular network 222. For example, the distance between the position 204 and the entry point 206 of the pre-determined location 230 is d1 and the speed of the mobile device 216 is speed1. The arrival time Ta may be determined by:

$$Ta = T1 + d1/speed1 \quad \text{Formula 1}$$

Also, for example, the distance between the exit point 212 and the cellular position 214 on the route is d2 and the speed of the mobile device 216 for distance d2 is speed2. The departure time Td may be determined by:

$$Td = T2 - d2/speed2 \quad \text{Formula 2}$$

FIG. 2 also shows a location 230 covered by a WiFi network 210 along the route 218. The Wifi network 210 provides network access within the location 230 which has pre-determined geographical boundaries. As shown in FIG. 2, the radius 224 of the WiFi network coverage location 210 is within the location 230. WiFi coverage may be provided by, e.g., one or more access points located within the location 230, with triangulation executed by the network data collector 130 to determine location of the mobile device 216 within the location 230.

In FIG. 2, when the mobile device 216 passes through the location covered by the WiFi network 210, multiple types of events may be recognized by the cellular network 222 and the WiFi network 210, including an entry event and an exit event. The entry event corresponds to the mobile device 216 passing through the entry point 206 into the location 230, and the exit event corresponds to the mobile device 216 passing from the location 230 back into the cellular network 222. Both the entry event and the exit event may be identified by a time and a location. Similarly as the cellular network, the locations of entry event and exit event recognized might not be the exact entry point or exit point of mobile device 216. For example, a WiFi identifier (MAC address), a time (T1') and a point 208 within the location 230 near the entry point 206 may be recorded by the WiFi network as the entry event for mobile device 216, and a WiFi identifier (MAC address), a time (T2') and a point 211 within the location 230 near the exit point 212 may be recorded by the WiFi network as the exit event for mobile device 216.

Also, the arrival time for a mobile device 216 to enter the pre-determined location 230 maybe estimated as Ta' based on the entry event of mobile device 216 recorded by WiFi network 210, and the departure time may be estimated as Tb' based on the exit event of mobile device 216 recorded by WiFi network 210. For example, the distance between the entry event position 208 recorded by WiFi network 210 and the entry point 206 of the pre-determined location 230 is d1' and the speed of the mobile device 216 is speed1'. The arrival time Ta' may be determined by:

$$Ta'=T1'-d1'/speed1' \qquad \text{Formula 3}$$

Also, for example, the distance between the exit point 212 and the last WiFi position 211 on the route is d2 and the speed of the mobile device 216 for distance d2' is speed2'. The departure time Td may be determined by:

$$Td'=T2'+d2'/speed2' \qquad \text{Formula 4}$$

Because the same mobile device is tracked, the instance when the mobile device switches from the outdoor cellular network 222 to the indoor WiFi network 210, or the instance when the mobile device switches from the indoor WiFi network 210 to the outdoor cellular network 222, may be spatially and temporally correlated. Thus, the cellular identifier (e.g., the mobile phone number) of mobile device 216 may be matched with the mobile device network interface identifier (e.g., the WiFi MAC Address) when Ta is very close to (i.e. within a first predetermined number of minutes of) Ta', and/or Td is very close to (i.e. within a second predetermined number of minutes of) Td'. Each predetermined number of minutes may be the same, within less than about 5 minutes, within less than about 8 minutes, within less than about 10 minutes, within less than about 12 minutes or within less than about 15 minutes. Therefore, the cellular identifier and the network interface identifier may be considered a match when the entry event locations recorded by cellular network and WiFi network are both very close to (i.e. within a first predetermined distance from) the entry point 206, and/or the exit event locations recorded by cellular network and WiFi network are both very close to (i.e. within a second predetermined distance from) the exit point 211. In this context, the predetermined distances may be the same. Each predetermined distance may be one of the following: about 4-5 meters, about 10 meters, about 15 meters, about 20 meters or about 50 meters.

If more than one network interface address, e.g., MAC address, is found to meet one cellular identifier of mobile device 216, those network interface addresses may be regarded as candidate network interface identifiers or a candidate network interface identifier set (e.g., MAC address set), to match the cellular identifier, e.g., phone number, of mobile device 216. The candidate network interface identifier set may also be referred to as a matching set of candidate network interface identifiers. Also, if more than one cellular identifier, e.g., phone number, of the mobile device 216 is found to meet one network interface identifier, e.g., MAC address, those cellular identifiers may be regarded as the candidate mobile device cellular identifiers or a candidate mobile device cellular identifier set (e.g., phone number set). Thus, the network signal analysis for matching a mobile device cellular identifier with a mobile device network interface identifier disclosed herein may start with finding a match for one (selected) cellular identifier to one network interface identifier among a candidate network interface identifier set, e.g. MAC address set, or the analysis may start with finding a match for one (selected) network interface identifier for one cellular identifier among a cellular identifier set, e.g. phone number set. The analysis may also utilize the combination of both ways together. The result of the analysis may be the identification of a specific mobile device cellular identifier that belongs to a mobile device identified by a specific mobile device network interface identifier. Further, the result may be the identification of a specific match between a selected cellular identifier and a specific network interface identifier.

Figure 3:
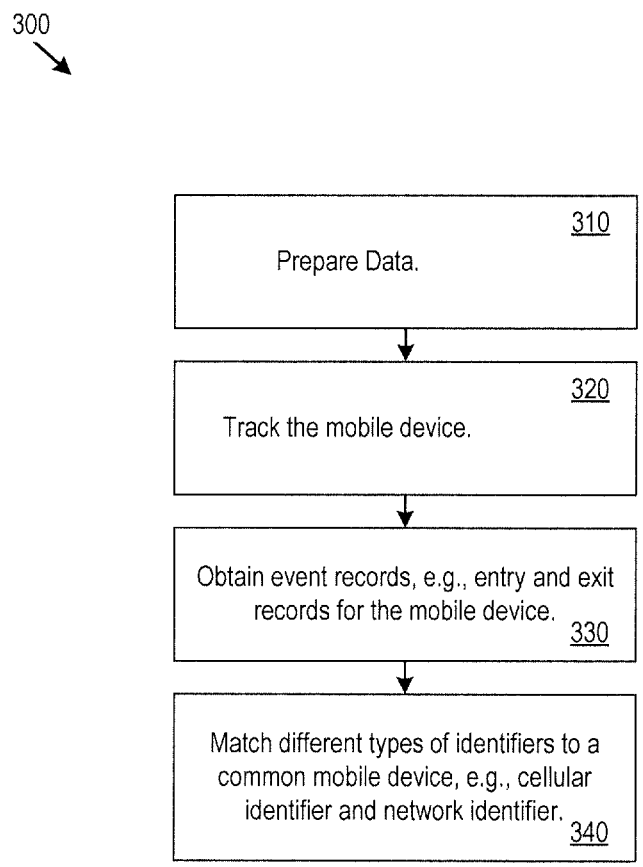
FIG. 3 shows an example of logic that a signal analysis system may implement to match a mobile device cellular identifier with a mobile device network interface identifier.

FIG. 3 shows an example of the overall logic 300 that interacting systems including the signal analysis system 102 may implement to match a mobile device cellular identifier with a mobile device network interface identifier. FIGS. 4-7 provide additional details. As shown in FIG. 3, the logic includes preparing data (310), tracking the mobile device (320), obtaining event records, e.g., entry and exit records for the mobile device (330) and matching different types of identifiers to a common mobile device, e.g., cellular identifier and network interface identifier (340).

CNBP may track the mobile device by a phone number or other mobile device identifier for a first network, e.g., a cellular network for the outdoor environment. WNBP may track the same device by a second type of identifier, e.g., a MAC address for a second type network, e.g., an indoor data network environment. Because the same mobile device is tracked, the instance when the mobile device switches from the first type of network, e.g., an outdoor cellular network, to a second type of network, e.g., an indoor WiFi network, may correlate at the same time and the same location. The logic 300 may analyze this spatial and temporal correlation to create a one-to-one map between the first type of identifier (e.g., the phone number or IMEI) and the second type of identifier (e.g., the MAC address).

To prepare the data (310), cellular towers may record messages from the mobile device that are identified by the phone number or IMEI. These messages may be defined by the cellular network specifications and originally may be intended for conventional cellular network operation. The messages may include a timestamp, signal strength, the mobile phone number and other information.

Also, to prepare the data (310), WiFi Access Points (AP) may capture probing requests from the mobile phone. The probe requests may be identified by the MAC address for the mobile device. The probing requests may be those defined by IEEE 802.11 specification and may be originally intended for discovering the AP that is used. The probing request may include timestamp, signal strength, device type, MAC address and other information.

To track the mobile device (320), CNBP may identify the position of the mobile phone based on the messages received by cellular towers. CNBP may be executed at the cellular data collector 110, at the signal analysis system 102, or at other locations. The signal strength may be used to compute the distance between the transmitter and the receiver. Multiple cellular towers may receive the same message and as such the triangulation method may be applied to identify the position of the mobile phone. Similarly, WNBP may identify the position of the mobile phone with the same method. WNBP may be executed at the network data collector 130, at the signal analysis system 102, or at other locations. Note that WiFi APs may be deployed much denser than the cellular towers and hence WNBP may be able to identify the position of the mobile device more accurate than CNBP. However, the second type of network may generally be a shorter distance network such as an indoor WiFi network using distributed APs. Said another way, the first type of network, e.g., the cellular network, may have a wider coverage than the second type of network.

To obtain event records (330), e.g., entry and exit records for the mobile device, the signal analysis system 102 may request the CPR and NPR records from the cellular data collector 110 and the network data collector 130, and may extract the events, including when the mobile device enters and exits a location. The location may be pre-determined, for example, a building or a shopping mall that is covered by a WiFi network. The network events may be tagged with the time when the mobile device having a specific second type of identifier, such as a MAC address, enters and exits the location. Cellular events may be tagged with the time when the mobile device having a specific first type of identifier enters and leaves the location. Each cellular position record (CPR) such as a phone number record (PNR) or a network positioning record (NPR) such as a MAC address record (MAR) may include multiple different data elements. For example, these records may include the entering time, the leaving time, the location name and the mobile device identifier. The mobile device identifier may be the cellular identifier, e.g., the phone number or the network interface identifier, e.g., the MAC address.

To match different types of identifiers to a common mobile device, e.g., cellular identifier and network interface identifier (340), the signal analysis system 102 may proceed as noted below.

For each network event record such as a MAR, the logic 300 may find the mobile device cellular identifiers within cellular event records such as PNRs with very close entering time, leaving time or both, and the same location as a matching set. Because CNBP may be coarse, the time of entering and exiting the location may cover a wide range. As such, each MAR may correspond to multiple candidate mobile device cellular identifiers that may be denoted by candidate mobile device identifier set, for example, candidate phone number set (CPNS).

Thus, each time when a mobile device, e.g., a mobile phone, enters a location where WNBP is available, a CPNS may be created for this mobile phone. The signal analysis system 102 may compare CPNS across multiple events and delete those candidate mobile phone numbers when they are not the same phone number in different events for the MAC address in the WNBP record. The process may continue until only one specific mobile phone number is left. This left mobile phone number is determined to be the matching mobile phone number for the MAC address in the WNBP record. Then, the mobile device may be identified by both the matched specific mobile phone number and the specific MAC address.

Figure 4:
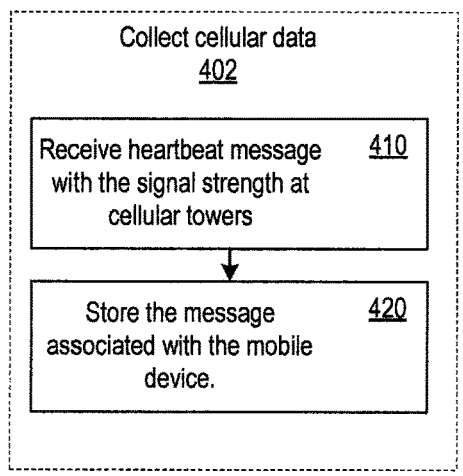
FIG. 4 shows an example of logic that a signal analysis system may implement to collect cellular data and network data.
Figure 4:
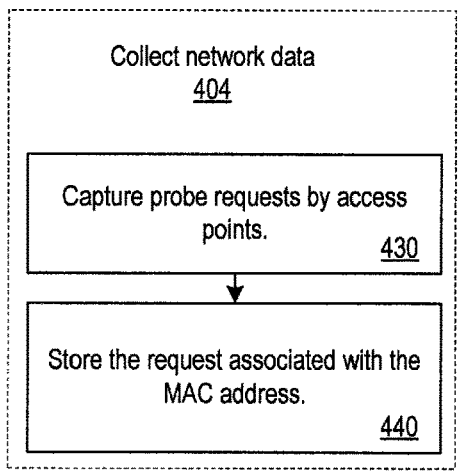

FIG. 4 shows an example of logic 400 for preparing data (312). The data collected may include signal strength of Wi-Fi requests and phone calls, phone numbers, and MAC addresses from mobile base stations and wireless routers.

As shown in FIG. 4, the logic to collect cellular data 402 may include receiving network messages (e.g., including signal strength and first type of identifier) at the cellular towers (410) and storing the network messages associated with the mobile device (420). In a cellular environment, when a mobile phone user makes a phone call or changes the location, mobile base stations (cellular towers) may receive the heartbeat message with the signal strength and the phone number that identifies the mobile phone. The signal strength may decrease as the distance between mobile phone and base station increases. After the messages are received at the cellular towers, they may be stored in a computer readable storage at the cellular towers or in connected databases. Received messages may include a timestamp, signal strength, and a phone number.

FIG. 4 also shows the logic to collect the network data 404. The logic captures probe requests at access points (430), stores the request associated with the MAC address (440). In a second type of network, e.g. a WiFi network, a mobile phone may issue probe requests to the access points (APs) around it, and APs may monitor and record the signal strength of these requests and the MAC address which identifies the mobile phone. The signal strength of Wi-Fi requests may decrease as the distance between the mobile phone and the access point increases. The capture probed request may be stored in a computer readable medium in the AP or in a connected database. A probe request may include at least a timestamp, signal strength, a device type, and a MAC.

Figure 5:
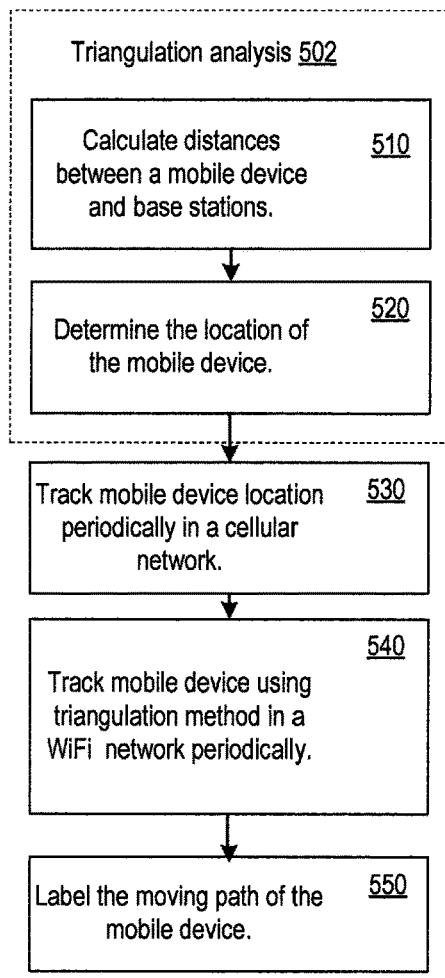
FIG. 5 shows an example of logic for tracking a mobile device, e.g., a mobile phone.

FIG. 5 shows an example of logic 500 for tracking a mobile device (320). As discussed above, the distances between a mobile phone and base stations or between a mobile phone and APs may be calculated based on signal strength. As shown in FIG. 5, the triangulation analysis 502 may be used to determine the location of a mobile device, e.g., a mobile phone. In FIG. 5, the triangulation analysis 502 calculates distances between a mobile device and base stations (510) and determines the location of the mobile device (520). For example, the distances between a mobile phone and mobile base stations can be determined based on signal strength for the same phone number. The distances for three base stations may be determined as: RX1, RX2, and RX3. The possible locations of the mobile device are on spheres of radius of RX1, RX2, and RX3 around the three base stations. Thus, the intersection of the sphere surfaces identifies by triangulation the location of the mobile phone. The triangulation analysis 502 may be used to determine location of the mobile device in both the cellular network environment and the WiFi network.

As shown in FIG. 5, the triangulation analysis 502 may track the location of the mobile device periodically in a cellular network (530). For example, the triangulation analysis 502 may track the mobile phone location every ten minutes outside buildings based on signal strength of phone calls for the mobile device that are identified by a phone number. The triangulation analysis 502 may also track the location of the mobile device in a WiFi network (540). For example, the triangulation analysis 502 may track mobile device location every ten minutes inside buildings based on signal strength of WiFi requests of the mobile device that is identified by the MAC address. The moving path of mobile device for both inside and outside buildings may be derived according to the location information of the mobile device that is identified by the phone number or IMEI and the MAC address 550.

Figure 6:
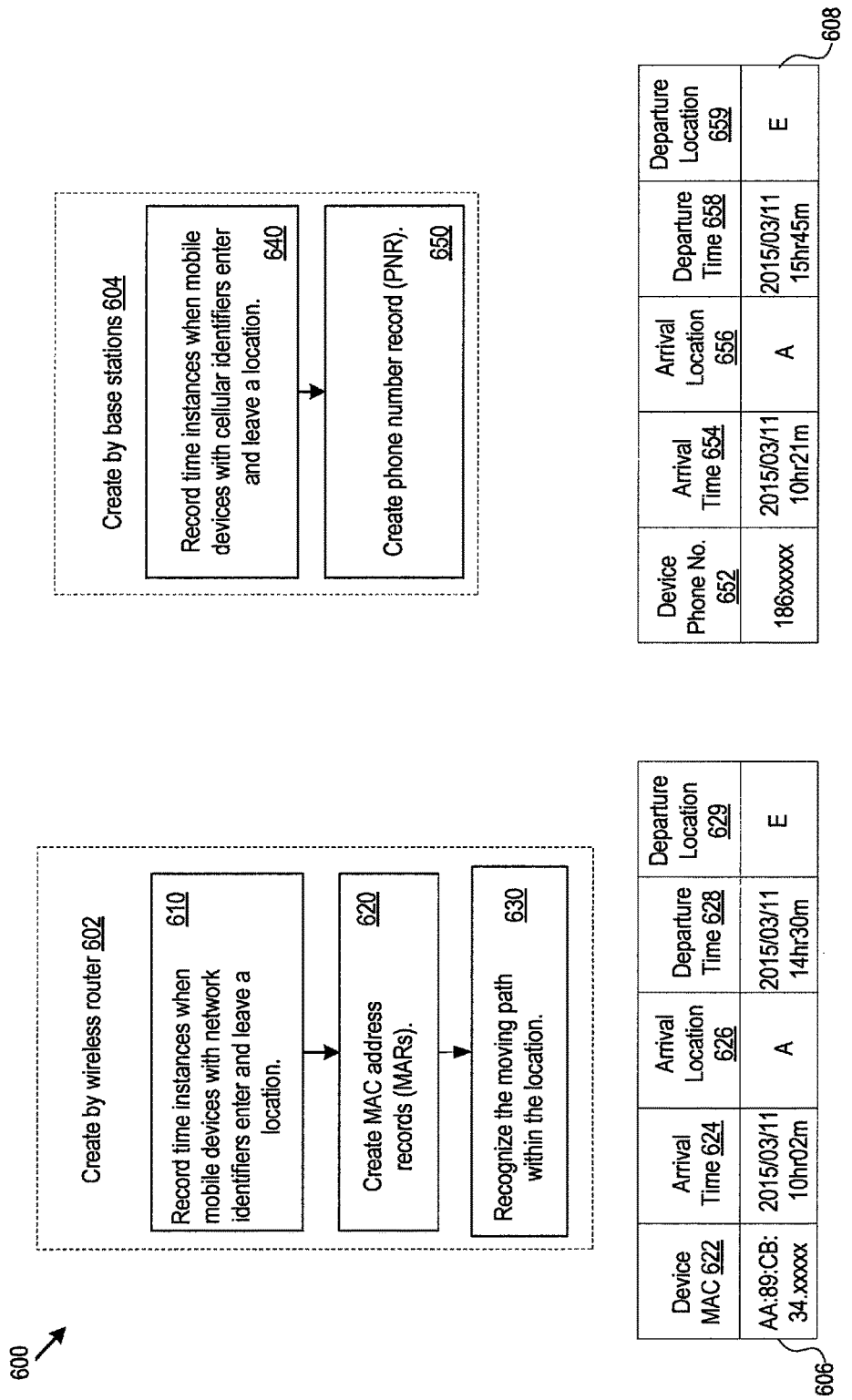
FIG. 6 shows an example of logic for creating records when the mobile device, e.g., mobile phone, enters or leaves a location such as a building.

FIG. 6 shows an example of logic 600 for creating tracking records when the mobile device, e.g., mobile phone, enters or leaves a location such as a building 500. As shown in FIG. 6, the tracking records may be created by wireless router (602) or by base stations (cellular towers) (604). The logic to create track records by wireless router 602 may record time instances when mobile devices, e.g., mobile phones, enter and leave a location (610), create MAC address records (MARs) (620) and recognize the moving path within the location (630) for the tracked mobile devices, e.g., against pre-determined boundaries for locations. For example, when a mobile phone enters and leaves a building, the time is recorded. Wireless routers may be used to record the time instances when the mobile phone enters and leaves the building. Each mobile device may have a MAC address. As shown in FIG. 6, each MAR 606 may have device MAC 622, arrival time 624, arrival location 626, departure time 628 and departure location 629. When inside the building, the MAC addresses of the mobile phone may be recognized by wireless routers and the moving path of the mobile phone may be identified by the MAC addresses and changing location over time.

The logic to create track records by base stations 604 may record time instances when mobile devices enter and leave a location (640) and create phone number records (PNRs) (650). For example, mobile base stations may be used to record the time instances when a mobile phone identified by an IMEI enters or leaves a building. As shown in FIG. 6, each PNR 608 may have device phone no. 652, arrival time 654, arrival location 656, departure time 658 and departure location 659.

Figure 7:
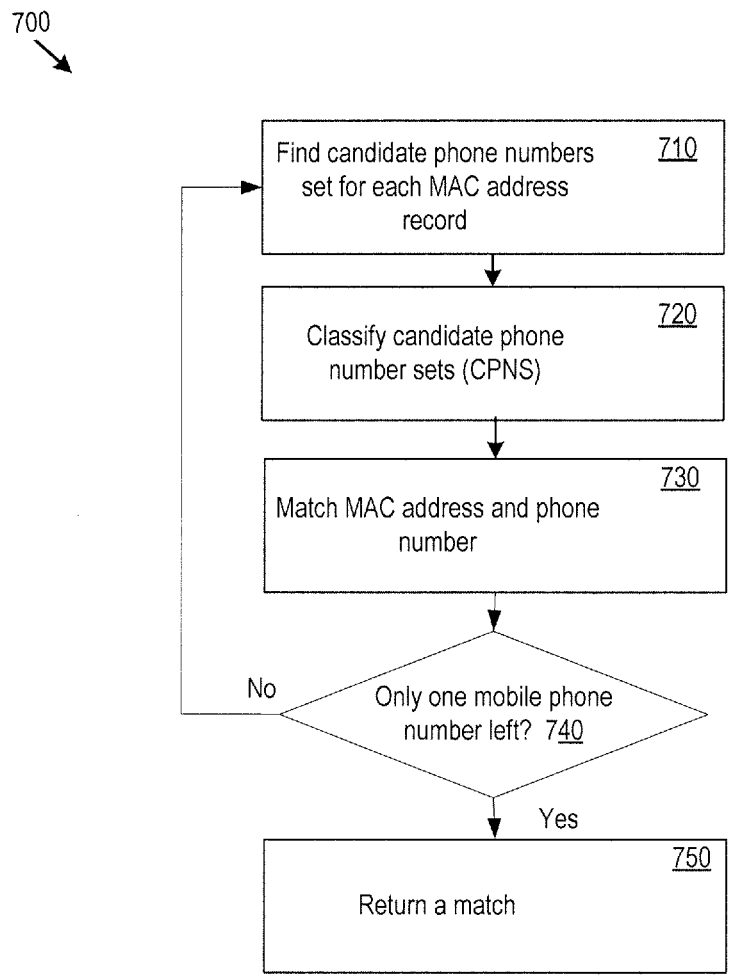
FIG. 7 shows an example of logic for identifying spatial-temporal correlation between the phone number and the MAC address.

FIG. 7 shows an example of logic 700 for identifying spatial-temporal correlation between the phone number and the MAC address. As shown in FIG. 7, the logic 700 finds a candidate phone numbers set for each MAC address record (710). For example, for each MAC address record (MAR), the logic finds phone number records (PNR) with same entering time, leaving time and location identifier (e.g., building name). Because CNBP may be a coarse positioning method, the estimated time of entering and exiting a given building identified by PRNs might not be very accurate. Thus, for each MAR there may be multiple corresponding PNRs having similar entering times and leaving times (e.g., entering times within minutes of each other and leaving times within minutes of each other), as well as the same building name (as discussed above in the context of FIG. 3). The set of the phone numbers may be defined as a candidate phone number set (CPNS).

The logic may further classify this CPNS (720). For example, all the candidate phone number sets (CPNSs) for the same MAC address are combined. First candidate mobile device cellular identifiers and second candidate mobile device cellular identifiers may each be implemented as a CPNS. A mobile phone may visit the same building several times or may visit several buildings. Since each visit event may be recorded by both the mobile base station and the AP, one MAR and one PNR will be generated. Therefore, for each MAC address, there may be multiple corresponding CPNSs assuming that the mobile phone enters the building multiple times.

The logic 700 may be configured to match the MAC address and phone number (730). The logic 700 may compare multiple CPNSs in different visit events. Because for the same mobile device, only one mobile phone number may match the MAC address, those candidates that have different mobile phone numbers in different CPNSs are deleted. As shown in FIG. 7, after the logic to match the MAC address and the phone number (730) is performed, the logic determines whether only one mobile phone number is left (740). If yes, the left mobile phone number and the MAC address is a match, they both can be used to identify the mobile device. However, if no, which means there are more than one mobile phone numbers left that may be associated with the MAC address, the logic is configured to go back to find candidate phone numbers set for the MAC address (710) to repeat the process to find the one phone number that matches the MAC address.

Figure 8:
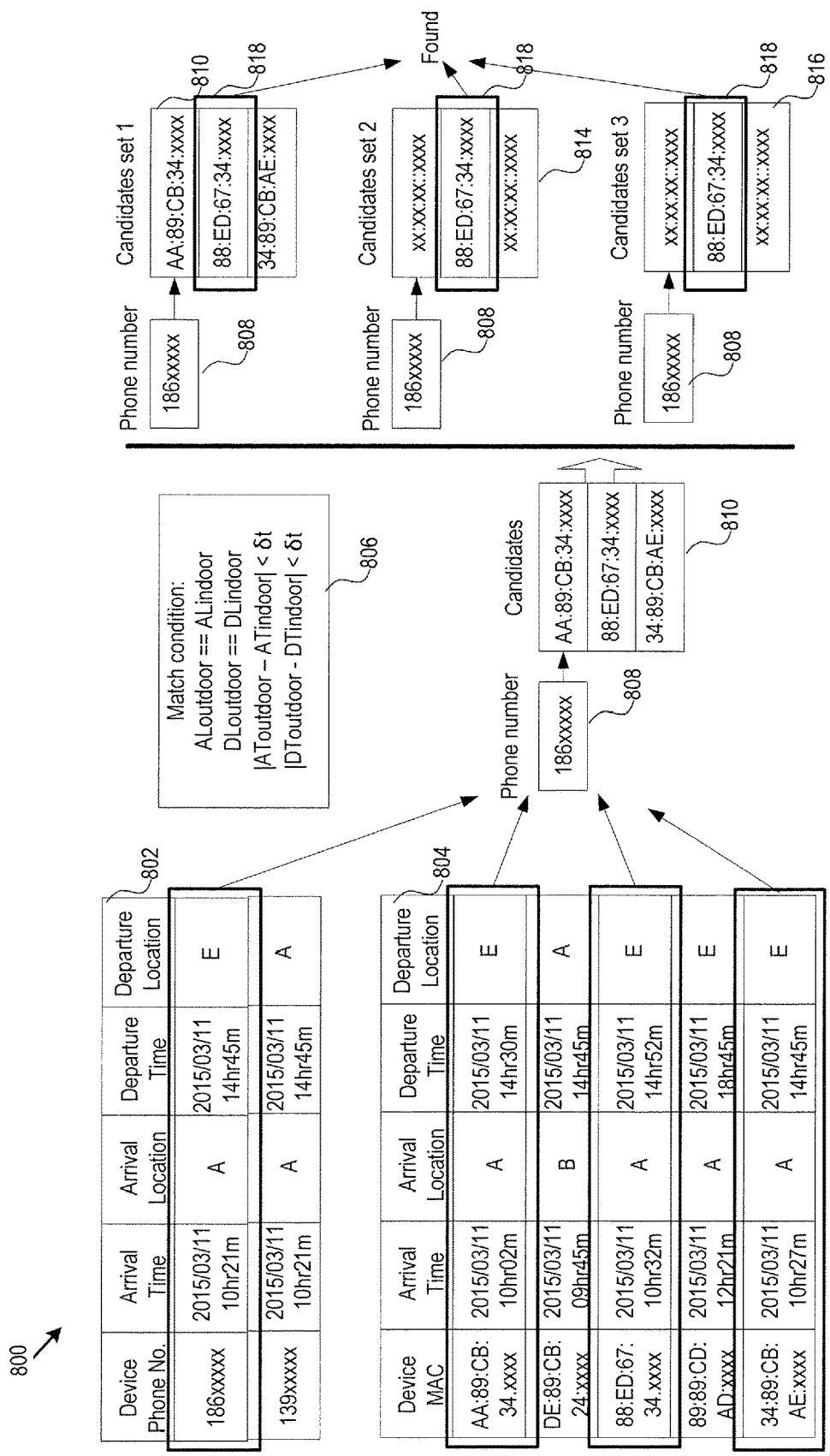
FIG. 8 shows an example of a process for matching the mobile phone number with the MAC address by starting with finding candidate MAC addresses set for one mobile phone number.

The logic 700 shown in FIG. 7 starts with finding a candidate phone number among multiple candidate phone numbers for one MAC address. As described above, it is also possible to find one MAC address among multiple candidate MAC addresses for one selected phone number. FIG. 8 shows an example of the logic 800 for matching the selected mobile phone number with the MAC address by starting with finding candidate MAC address set for one mobile phone number. In FIG. 8, outdoor tracking data is identified by the phone number and indoor tracking data is identified by the MAC address.

As shown in FIG. 8, PNR 802 and MAR 804 are used for matching the mobile phone number and the MAC address. A set of selected phone numbers within a first event window may be identified. There may be only one phone number in the set of selected phone numbers. For example, a timing parameter specifying a number of seconds or minutes (e.g., 60 minutes) may be obtained. A set of PNRs and a set of MARs, each including a timestamp within the event window, may be identified. The set of PNRs of MARs may be referred to as a first subset in the sense that the set of PNRs and MARs is a proper subset of all PNRs and MARs in one or more databases.

The process discussed above may be repeated for a second subset of PNRs and MARs, each including a timestamp in a second event window. The second event window may differ from the first event window and the second subset of PNRs and MARs may include PNRs that are not in the first subset of PNRs and MARs.

For each selected phone number in the sets of PNRs mentioned above, one or more candidates MAC addresses may be found and formed the candidate MAC address set. The match condition 806 for identifying one or more candidates MAC addresses to form the candidate MAC address set 810 for one phone number 808 may be set as follows:

1. Arrival location in PNR for tracking the outdoor activities ($AL_{outdoor}$) of the mobile device in a cellular network is within a predefined matching threshold to the arrival location in the MAR for tracking indoor activities ($AL_{indoor}$) of the tracked mobile device in the WiFi network;

2. Departure location in PNR for tracking the outdoor activities ($DL_{outdoor}$) of the mobile device in a cellular network is within a predefined matching threshold to the departure location in the MAR for tracking indoor activities ($DL_{indoor}$) of the tracked mobile device in the WiFi network;

3. The absolute value of difference between arrival time in PNR for tracking the outdoor activities ($AT_{outdoor}$) of the mobile device in a cellular network and the arrival time in the MAR for tracking indoor activities ($AT_{indoor}$) of the tracked mobile device in the WiFi network is less than a first predetermined threshold $\delta_{1t}$; and 4. The absolute value of difference between departure time in PNR for tracking the outdoor activities ($DT_{outdoor}$) of the mobile device in a cellular network and the departure time in the MAR for tracking indoor activities ($DT_{indoor}$) of the tracked mobile device the WiFi network is less than a second predetermined threshold $\delta_{2t}$. The first predetermined threshold $\delta_{1t}$ and the second predetermined threshold $\delta_{2t}$ may be the same or different. In FIG. 8, the two thresholds have the same value $\delta_t$.

When multiple MAC addresses 810 for one phone number are found to form the candidate MAC address set, the logic 800 may search for additional PNR records with the same phone number 808 and apply the same match condition 806 to find additional candidate MAC addresses to form one or more additional candidate MAC address sets.

FIG. 8 shows an example that three candidate MAC address sets are created for the same phone number 808. One of the candidate MAC address sets may correspond to the first subset discussed above and another of the candidate MAC address sets may correspond to the second subset discussed above. As shown in FIG. 8, each candidate MAC address set has more than one candidate MAC addresses. The process removes the candidate MAC addresses when the candidate MAC addresses are different among different candidate MAC address sets. As shown in FIG. 8, all candidate MAC addresses are removed other than "88:ED:67:34:xxxx" which has the same value in all three candidate MAC address sets. The process may be repeated until only one MAC address 818 is found as shown in FIG. 8 where the MAC address is the only MAC address that appears in all the three candidate MAC address sets: candidate MAC address set 1 810, candidate MAC address set 2 814 and candidate MAC address set 3 816. Identifying the one MAC addresses in all three candidate MAC address sets may be understood as identifying the overlap between the candidate MAC address sets. The candidate MAC address sets may also be referred to as matching sets or matching sets of candidate network interface identifiers for a selected cellular identifier. As such, MAC address "88:ED:67:34:xxxx" is found to be the specific match for phone number "186xxxxx" 808. Both numbers may be used to track one mobile device in both cellular network and the WiFi network.

Figure 9:
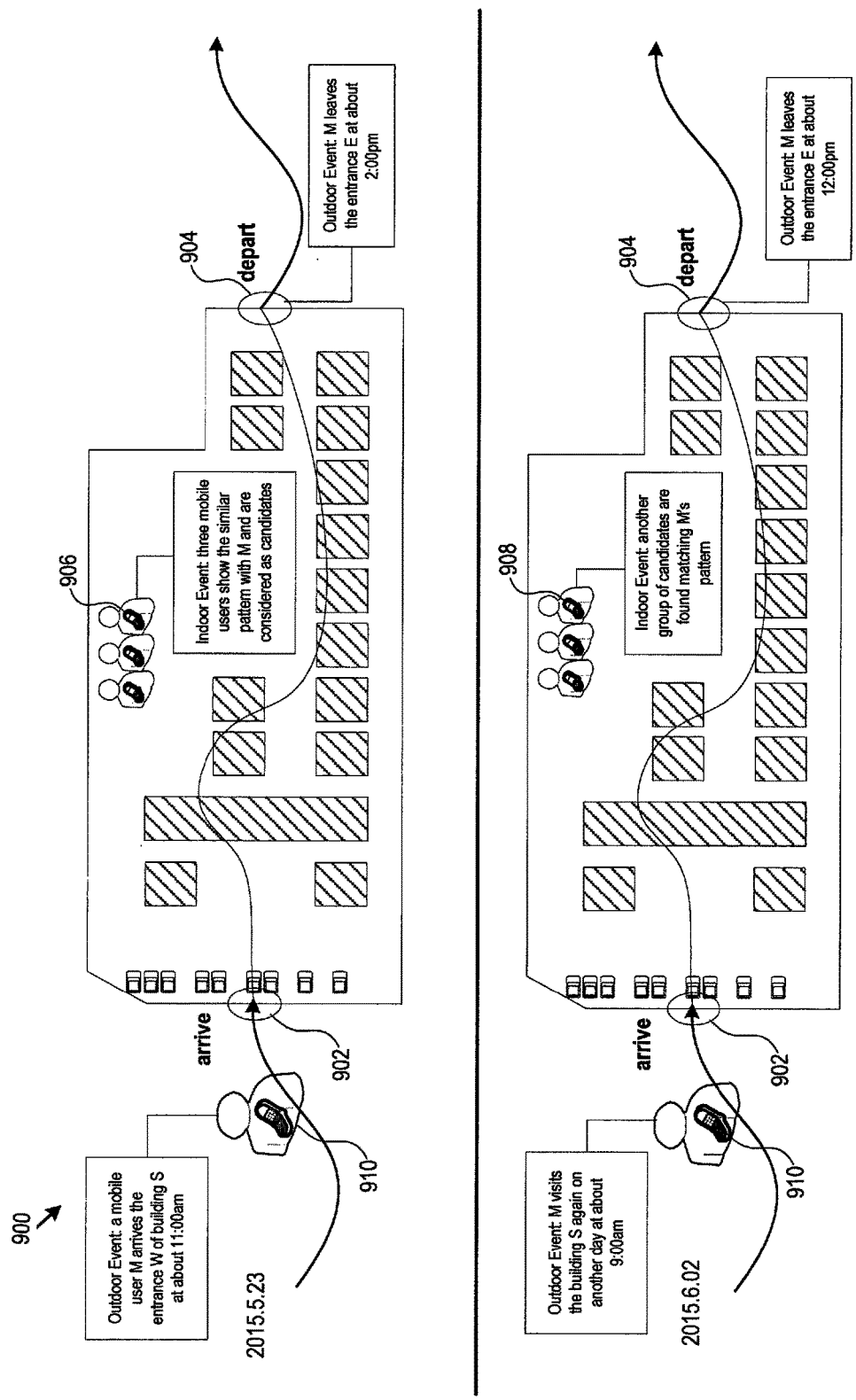
FIG. 9 illustrates both outdoor events and indoor events when a mobile device moves through a building at different dates and different time.

FIG. 9 illustrates both outdoor events and indoor events when a mobile device moves through a building at different dates and different time 900. As illustrated in FIG. 9, a mobile device 910 carried by a mobile user M arrives the arrival point 902 of building S at about 11:00 am and leaves the departure point 904 at about 2:00 pm on May 23, 2015. At about the same time frame, three similar mobile devices 906 carried by three users may be discovered inside the building S that show the similar pattern as the mobile device 910 carried by the mobile user M. All three mobile devices 906 carried by three mobile users may arrive the arrival point 902 of building S at about 11:00 am and may leave the departure point 904 at about 2:00 pm on May 23, 2015. As such, all three mobile devices 906 carried by three users may be considered as candidates for the mobile device 910 carried by the mobile user M.

FIG. 9 also illustrates another scenario for the mobile device 910 carried by the mobile user M enters the arrival point 902 of building S at about 9:00 am and leaves the departure point 904 at about 12:00 pm on Jun. 2, 2015. Three mobile devices 908 carried by the three users may be considered candidates for the mobile device 910 carried by user M.

Figure 10:
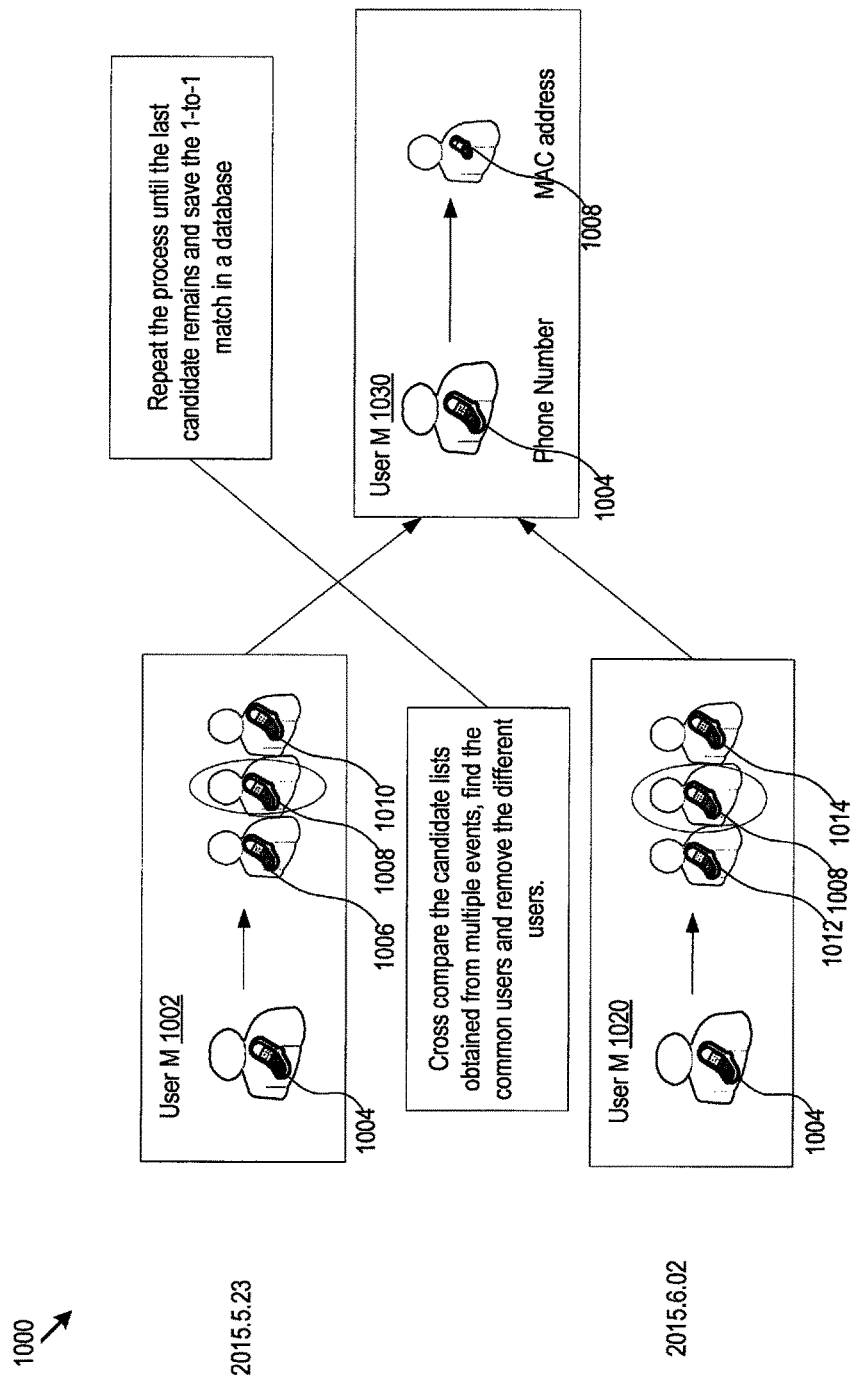
FIG. 10 illustrates logic that a signal analysis system may implement for matching for the scenarios illustrated in FIG. 9.

FIG. 10 illustrates the matching process for the scenarios illustrated in FIG. 9 1000. As illustrated in FIG. 10, the mobile device 1004 carried by the user M on May 23, 2015 on candidate group1 1002 that has three candidate mobile devices: candidate device1 1006, candidate device2 1008 and candidate device3 1010. FIG. 10 also illustrates that the same mobile device 1004 on Jun. 2, 2015 that has three candidate mobile devices: device4 1012, device5 1008 and device6 1014 on the candidate group2 1020. After comparing candidates in the candidate group1 1002 and the candidate group2 1020, only device2 1008 and device5 1008 have the same MAC address among two groups. As such, the phone number for mobile device 1004 and the MAC address for device 2 (and device5) 1008 are determined to be a match. The mobile device 1004, device 2 and device 5 are determined to be the same mobile device. Both the phone number and the MAC address may be used to identify this mobile device. The cellular identifier (e.g., phone number or IMEI) and the network interface identifier (e.g., MAC address) for the mobile device are matched together. The matching result may be saved to a database (not shown). If more than one devices maybe detected as the candidates for the same MAC addresses in both candidate group1 1002 and candidate group2 1020, the process may be repeated by reading in more candidate groups, e.g., candidate groups for different dates. Because the cellular identifier and network interface identifier are different identifiers for one mobile device, the final matching result of the process has 1-to-1 relationship for the phone number and the MAC address.

Figure 11:
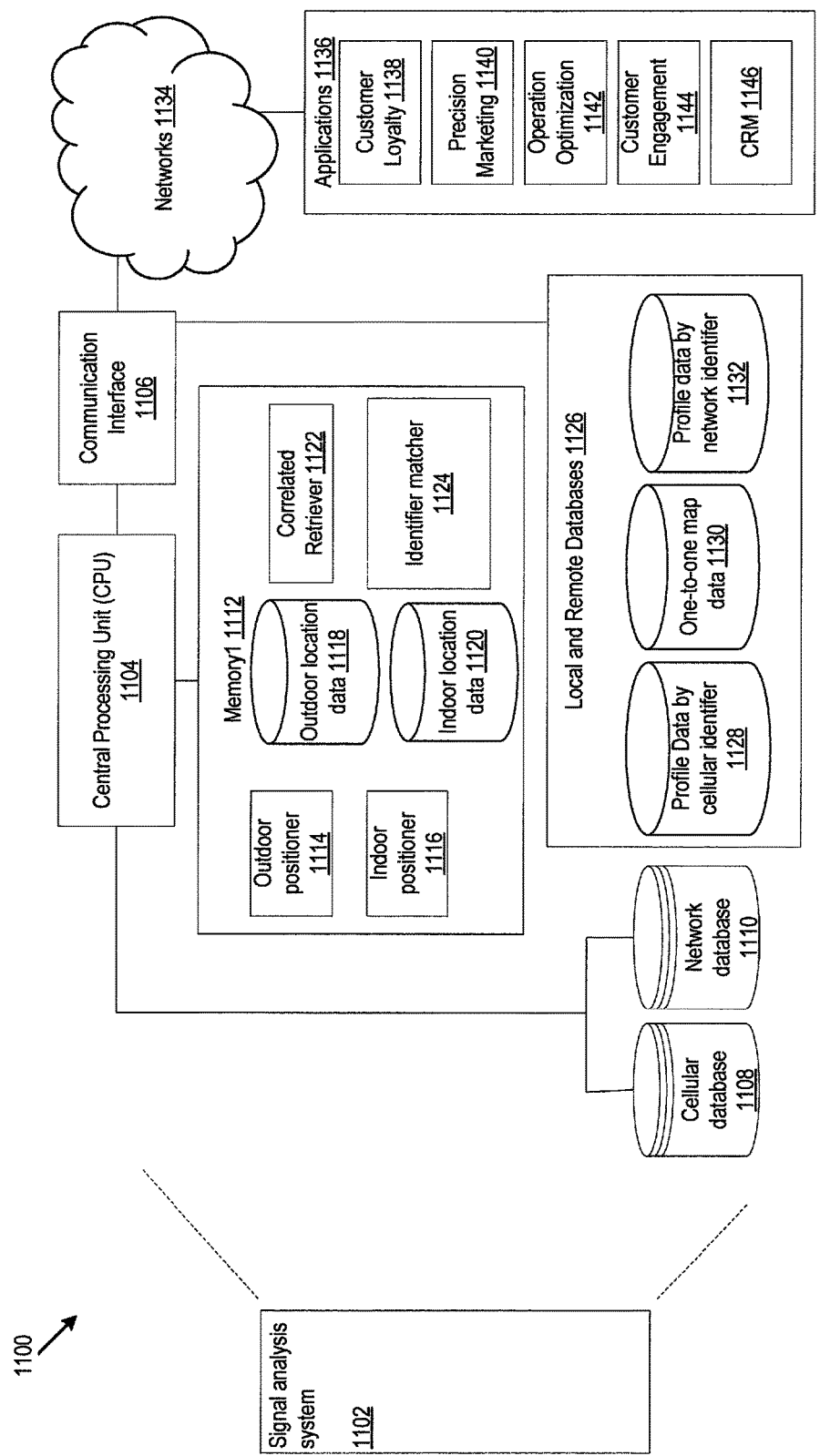
FIG. 11 shows an example signal analysis system for matching a mobile device cellular identifier with a mobile device network interface identifier.

FIG. 11 shows an example of system diagram 1100 that depicts a signal analysis system 1102 for matching a mobile device cellular identifier with a mobile device network interface identifier. As shown in FIG. 11, the signal analysis system 1102 includes processing circuitry in the form of a central processing unit (CPU) 1104, and further includes a communication interface 1106. The signal analysis system 1102 connects to a cellular connectivity database 1108 and a network interface database 1110. The CPU 1104 may cause the communication interface 1106 to read a first type of network data, e.g., cellular data from the cellular connectivity database 1108 and read a second type of network data, e.g., WiFi network data, from network interface database 1110.

The cellular connectivity database 1108 may store messages from the mobile device that are identified by the phone number or IMEI, and the messages may include a timestamp, signal strength, the mobile phone number and other information. The network interface database 1110 may store probing requests from the mobile phone, and the probe requests may be identified by the MAC address for the mobile device. In addition, the signal analysis system 1102 may connect to other databases 1126, such as the profile data by cellular identifier 1128 that identifies the user who carries the mobile device identified by the phone number or IMEI, profile data by network interface identifier 1132 that identifies the user who carries the mobile device identified by the network interface identifier, and one-to-one map data 1130 that correlates the cellular identifier and the network interface identifier for the mobile device.

The signal analysis system 1102 includes the memory 1112. The CPU 1104 may execute the outdoor positioning logic 1114 stored in memory to generate the outdoor location data 1118 such as CPRs stored in the memory 1112. The CPU 1104 may also execute the indoor positioning logic to generate indoor location data 1120 such as NPRs stored in the memory 1112. Both CPRs and NPRs may also be stored in the database either on-line or offline. The correlated retriever logic 1122 may be executed by the CPU 1104 to retrieve the outdoor location data 1118 and the indoor location data 1120, and to correlate the retrieved data according to multiple different type of identifiers, e.g., a mobile device cellular identifier and a mobile device network interface identifier as described above with respect to FIGS. 7 and 8.

The CPU 1104 may further execute the identifier matching logic 1124 to create one-to-one relationship between the different types of identifiers, e.g., between the mobile device cellular identifier and the mobile device network interface identifier as described above with respect to FIGS. 7 and 8. As such, the signal analysis system 1102 provides one particular example of a system that identifies the link between the mobile device cellular records and the mobile device network records.

Also, as shown in FIG. 11, the communication interface 1106 may read the profile data and the map data stored in local and remote databases 1126 and communicate via networks 1134 with different applications 1136. The applications 1136 that may use the profile data and the map data may include applications for customer loyalty 1138, precision marketing 1140, operation optimization 1142, customer engagement 1144 and customer relationship management (CRM) 1146. That is, the signal analysis system 1102 may share mobile device movement, shopping, and route data with other systems. The systems may then deliver targeted advertising, execute customer loyalty rewards, or perform other processes responsive to the data.

The method and/or system, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The system may further include or access instructions for execution by the system. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A method for improved targeting of network communications comprising:
    obtaining, by a server, multiple cellular positioning records (CPRs) comprising:
        a mobile device cellular identifier;
        an event type;
        an event location where the event type occurred; and
        an event timestamp of occurrence of the event type;
    obtaining, by the server, multiple network positioning records (NPRs) comprising:
        a mobile device network interface identifier;
        an event type;
        an event location where the event type occurred;
        an event timestamp of occurrence of the event type; and
    performing, by the server, spatial matching and temporal matching of the CPRs and the NPRs to thereby associate a specific mobile device cellular identifier among the CPRs with a mobile device identified by a specific mobile device network interface identifier among the NPRs;
    generating, by the server, mobile device movement information for the specific mobile device based on the spatial matching and temporal matching; and
    communicating, by the server and to an application server, the mobile device movement information to thereby facilitate improved targeting of application specific network communications by the application server.

2. The method of claim 1, where:
    the event type in the CPRs and in the NPRs comprises:
    entry into a pre-determined location, exit from the pre-determined location, or both.

3. The method of claim 1, where:
    the event type in the CPRs and in the NPRs comprises:
    entry into or exit from a pre-determined indoor location; and further comprising:
    obtaining the NPRs from the indoor location.

4. The method of claim 1, where:
    the event type in the CPRs and in the NPRs comprises:
    exit from a pre-determined indoor location; and further comprising:
    obtaining the NPRs from the indoor location.

5. The method of claim 1, where:
    performing spatial matching comprises:
    matching event locations between the CPRs and the NPRs.

6. The method of claim 1, where:
    performing temporal matching comprises:
    matching event timestamps between the CPRs and NPRs.

7. The method of claim 6, where:
    matching event timestamps comprises determining whether the event timestamps are within a timestamp matching threshold.

8. The method of claim 1, where:
the multiple CPRs and the multiple NPRs fall into either a first pre-determined time window or a second pre-determined time window; and
where performing spatial matching and temporal matching comprises:
creating a first match set using the CPRs and NPRs in the first pre-determined time window, the first match set comprising a selected mobile device network interface identifier and first candidate mobile device cellular identifiers;
creating a second match set using the CPRs and NPRs in the second pre-determined time window, the second match set comprising the selected mobile device network interface identifier and second candidate mobile device cellular identifiers; and
identifying the specific mobile device network interface identifier as the selected mobile device identifier, when the first candidate mobile device cellular interface identifiers and the second candidate mobile device cellular identifiers include an identical mobile device cellular identifier.

9. The method of claim 1, where:
the mobile device cellular identifier comprises a cellular phone number.

10. The method of claim 1, where:
the mobile device network interface identifier comprises a media access control address.

11. A system for improved targeting of network communications comprising:
a communication interface configured to receive:
cellular positioning records (CPRs) comprising a cellular identifier and a cellular event timestamp; and
network positioning records (NPRs) comprising a network interface identifier and a network event timestamp;
a cellular connectivity database configured to store the CPRs;
a network interface database configured to store the NPRs; and
processing circuitry in communication with the cellular connectivity database and the network interface database, the processing circuitry configured to:
obtain a timing parameter defining a first event window and a second event window;
categorize the CPRs and NPRs into a first subset falling within the first event window and into a second subset falling within the second event window;
perform temporal-spatial matching on the cellular event timestamps and the network event timestamps in the first subset to determine a first matching set of candidate network interface identifiers for a selected cellular identifier;
perform temporal-spatial matching on the cellular event timestamps and the network event timestamps in the second subset to determine a second matching set of candidate network interface identifiers for the selected cellular identifier;
identify overlap between the first matching set and the second matching set to obtain a specific match between the selected cellular identifier and a specific network interface identifier among the candidate network interface identifiers to thereby determine a specific mobile device associated with both the selected cellular identifier and the specific network interface identifier;
generating mobile device movement information for the specific mobile device based on the spatial matching and temporal matching; and
communicating, to an application server, the mobile device movement information to thereby facilitate improved targeting of application specific network communications by the application server.

12. The system of claim 11, where:
the cellular event timestamp in the CPRs and the network event timestamp in the NPRs defines an entry time into a pre-determined location, an exit time from the pre-determined location, or both.

13. The system of claim 11, where:
the processing circuitry is further configured to request the CPRs through the communication interface from a cellular location tracking source.

14. The system of claim 11, where:
the processing circuitry is further configured to request the NPRs through the communication interface from a network location tracking source for a specific location.

15. The system of claim 14, where:
the cellular event timestamp records entry time into the specific location, exit time from the specific location, or both; and
the network event timestamp records entry time into the specific location, exit time from the specific location, or both.

16. The system of claim 15, where:
the cellular event timestamp records and the network event timestamp records comprise event time and event location.

17. The system of claim 16, where:
each cellular identifier comprises a cellular phone number.

18. The system of claim 16, where:
each network interface identifier comprises a media access control address.

19. A system for improved targeting of network communications comprising:
a communication interface configured to receive:
cellular positioning records (CPRs) comprising a cellular identifier comprising a cellular phone number and a cellular event timestamp that reports a first estimated entry time of a mobile device into a pre-determined location, or a first estimated exit time from the pre-determined location, or both; and
network positioning records (NPRs) comprising a network interface identifier comprising a media access control address and a network event timestamp that reports a second estimated entry time into the pre-determined location, or a first estimated exit time from the pre-determined location, or both for the mobile device;
a cellular connectivity database configured to store the CPRs;
a network interface database configured to store the NPRs; and
processing circuitry in communication with the cellular connectivity database and the network interface database, the processing circuitry configured to:
request the CPRs through the communication interface from a cellular location tracking source, and request the NPRs through the communication interface from a network location tracking source for the pre-determined location;
obtain a timing parameter defining a first event window and a second event window;

categorize the CPRs and NPRs into a first subset falling within the first event window and into a second subset falling within the second event window;

perform temporal-spatial matching on the cellular event timestamps and the network event timestamps in the first subset to determine a first matching set of candidate network interface identifiers for a selected cellular identifier;

perform temporal-spatial matching on the cellular event timestamps and the network event timestamps in the second subset to determine a second matching set of candidate network interface identifiers for the selected cellular identifier;

identify overlap between the first matching set and the second matching set to obtain a specific match between the selected cellular identifier and a specific network interface identifier among the candidate network interface identifiers to thereby determine that the mobile device is associated with both the selected cellular identifier and the specific network interface identifier;

generating mobile device movement information for the mobile device based on the spatial matching and temporal matching; and communicating, to an application server, the mobile device movement information to thereby facilitate improved targeting of application specific network communications by the application server.

20. The system of claim 19, where:

the processing circuitry is further to configured to:

obtain the CPRs and NPRs for an additional event window when the identified overlap comprises more than one candidate network interface identifiers, perform the temporal-spatial matching to determine the additional matching set of candidate network interface identifiers for the selected cellular identifier, and identify the overlap among the additional matching set, the first matching set and the second matching set to obtain the specific match when the identified overlap comprises only one candidate network interface identifier for the selected cellular identifier.

* * * * *